United States Patent
Price et al.

(10) Patent No.: US 8,526,884 B1
(45) Date of Patent: Sep. 3, 2013

(54) UTILIZING WAKEUP RECEIVERS FOR DEVICE COMMUNICATION

(75) Inventors: Andrew D. Price, Santa Clara, CA (US); Varada Gopalakrishnan, Cupertino, CA (US); Robert D. Lau, Dublin, CA (US)

(73) Assignee: Amazon Technologies, Inc., Reno, NV (US)

( * ) Notice: Subject to any disclaimer, the term of this patent is extended or adjusted under 35 U.S.C. 154(b) by 216 days.

(21) Appl. No.: 13/214,052

(22) Filed: Aug. 19, 2011

(51) Int. Cl.
*H04B 7/00* (2006.01)

(52) U.S. Cl.
USPC ........ 455/41.2; 455/419; 455/420; 455/553.1

(58) Field of Classification Search
USPC ............ 455/41.1–41.3, 418–420, 423, 553.1, 455/552.1, 557
See application file for complete search history.

(56) References Cited

U.S. PATENT DOCUMENTS

| | | | | |
|---|---|---|---|---|
| 2003/0031231 | A1* | 2/2003 | You et al. | 375/133 |
| 2004/0184100 | A1* | 9/2004 | Shahindoust | 358/1.15 |
| 2005/0057880 | A1* | 3/2005 | Bailey et al. | 361/119 |
| 2005/0220138 | A1* | 10/2005 | Barmettler | 370/465 |
| 2008/0200166 | A1* | 8/2008 | McCamon | 455/426.1 |
| 2009/0130977 | A1* | 5/2009 | Grushkevich et al. | 455/41.2 |
| 2009/0170455 | A1* | 7/2009 | Bowen et al. | 455/132 |
| 2011/0026738 | A1* | 2/2011 | Aoki et al. | 381/119 |
| 2012/0002704 | A1* | 1/2012 | Husted et al. | 375/136 |
| 2012/0115421 | A1* | 5/2012 | Wu et al. | 455/62 |

* cited by examiner

*Primary Examiner* — Dominic E Rego
(74) *Attorney, Agent, or Firm* — Novak Druce Connolly Bove + Quigg LLP

(57) ABSTRACT

Computing devices can utilize various low power wakeup transceivers in order to control functional states of various components of those devices. Each transceiver can broadcast a beacon including appropriate information, which can be received by any other device with a transceiver that is within a propagation range of the beacon. A transceiver receiving the beacon can cause the received beacon to be analyzed by appropriate decision logic, which can determine any appropriate functionality to be activated or otherwise contacted in response to the beacon. In at least some embodiments, the beacon can cause another type of communication channel to be activated to establish communications with a device from which the beacon was received. In this way, the communications channel can be established without having to leave the channel active or manually activate that channel.

27 Claims, 4 Drawing Sheets

UTILIZING WAKEUP RECEIVERS FOR DEVICE COMMUNICATION

BACKGROUND

As people are utilizing computing devices for an increasing variety of tasks, there is a corresponding increase in the functional demands on the devices. For example, users often will use a device such as a tablet computer or smart phone to transfer files, communicate with other devices or peripherals, and provide network connectivity. For at least some of these tasks, a given device will typically have to monitor for various types of connection signal, such as by keeping Bluetooth, WiFi, and cellular channels active. The components for these channels can be a significant drain on power, which can be particularly undesirable for smaller portable or mobile computing devices. One solution is to turn these channels off when not in use, but the user then must remember to turn the components on and off at the appropriate times, which can be at least inconvenient in many cases. Further, failing to activate a channel at an appropriate time can result in the user missing a call, being unable to receive messages, or otherwise being unable to perform an activity that would have been possible had the appropriate channel been active. Various other types of functionality on a computing or electric device can have similar issues.

BRIEF DESCRIPTION OF THE DRAWINGS

Various embodiments in accordance with the present disclosure will be described with reference to the drawings, in which.

DETAILED DESCRIPTION

Figure 1:
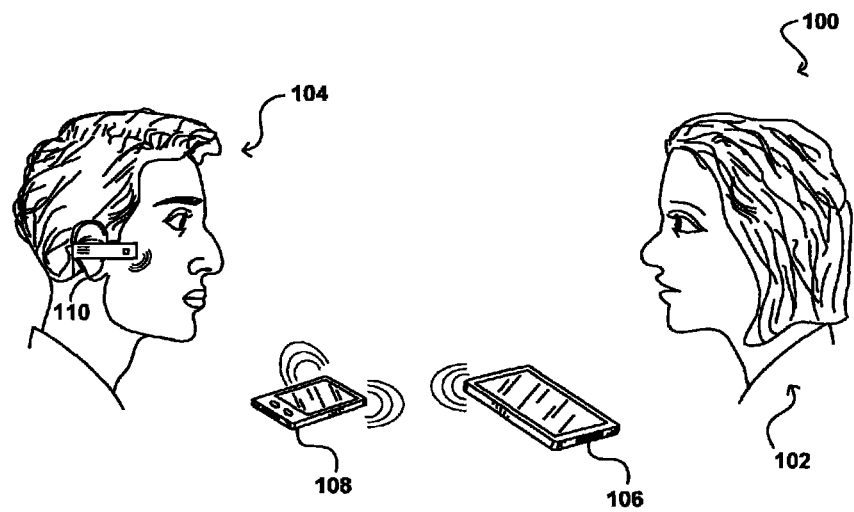
FIG. 1 illustrates an example situation wherein a user's computing device is attempting to communicate with various other devices in accordance with various embodiments.

Systems and methods in accordance with various embodiments of the present disclosure may overcome one or more of the aforementioned and other deficiencies experienced in conventional approaches to activating functionality and/or conserving power on an electronic device. In particular, various embodiments utilize a low power wakeup transceiver to detect beacons or other signals transmitted by various types of devices, and activate appropriate functionality in response to the beacon. The devices can also transmit a similar beacon or signal in order to cause appropriate functionality to be activated on other devices within a transmission range of the electronic device.

In various embodiments, at least one relatively low power wakeup transceiver (or separate transmitter and receiver) can be configured in a computing device to receive signals over an appropriate antenna or other such receiving mechanism. A received beacon signal can be any appropriate signal, such as a radio wave that is modulated to represent data through variations in the amplitude of the carrier wave. The transceiver can analyze the signal to attempt to locate an appropriate pattern transmitted by another device. The pattern can be any appropriate pattern, such as a general notification beacon, or can include other information, such as a device identifier, type of device, type of communication channel to be established, etc., although the amount of data that can be transmitted and received per unit time can be limited for various low power components. If such a pattern is located, the wakeup transceiver can transmit a notification signal to an appropriate component of the computing device, such as a communications processor or device CPU. The notification signal can include a simple activation or "Wake" notification, or can include information identifying the type of functionality to be activated or otherwise state-adjusted in response to detecting another device.

Use of such a wakeup transceiver can enable a computing device to obtain a level of awareness about other devices or components within the surrounding environment. A wakeup transceiver can have a longer range than elements such as radio-frequency identification (RFID) tags or proximity sensors, but can utilize much less power than Bluetooth or cellular components that continually and/or periodically search for connection signals. Further, due to the low power requirements a wakeup transceiver can be left on continually in at least some embodiments, such that higher-power components can be activated as appropriate when various connection signals or beacons are detected. Further, the low power requirements enable the transceiver to continually or at least periodically broadcast an appropriate beacon or other such signal to enable other devices to activate functionality necessary to communicate or otherwise interact with the computing device. In at least some embodiments, the wakeup transceiver works together with a low power microprocessor that is able to decode information in a received beacon and determine an appropriate action to take, such as to send a signal to a main processor, send a wakeup signal to a specific component, or perform another such action.

In at least some embodiments, the use of a wakeup transceiver can enable multiple devices to be paired together or otherwise communicate without manual user interaction. For example, a second device might come within range of a computing device. When the computing device detects a beacon transmitted from the second device, the computing device can decode the signal and activate an appropriate communication mechanism. If the communication mechanism is configured to pair or otherwise communicate with that device, a communication channel can be established automatically. In some embodiments, a user might instead be prompted before establishing the communication, etc.

Various other applications, functions, and advantages are presented below with respect to the various embodiments. It should be understood that the description and figures provide a number of examples, but the alternatives and variations possible within the scope of the various embodiments are not fully described. There alternatives and variations, however, would be apparent to one of ordinary skill in the art in light of the teachings and suggestions contained herein.

FIG. 1 illustrates an example situation 100 wherein a user 104 has a computing device 108 including at least one communication mechanism operable to enable that computing device to communicate wirelessly with other devices. In this example, there is a computing device 106 corresponding to another user 102 with whom the user 104 might want to share data. The user 104 also has a wireless headset 110 that the user might want to connect to the computing device 108 using an appropriate wireless communication channel, which might be the same as, or different from, the channel used to communicate with the other user's device 106. Although portable computing devices (e.g., a smart phone, an e-book reader, or tablet computer) are shown, it should be understood that various other types of electronic device that are capable of determining and processing input can be used in accordance with various embodiments discussed herein. These devices can include, for example, notebook computers, personal data assistants, cellular phones, video gaming consoles or controllers, and portable media players, among others.

As mentioned above, conventional approaches to connecting to various devices involve either leaving a communications mechanism on continually in order to be able to receive a connect request from one of these other devices, or manually activating a particular communications channel or component in order to enable the communications. This can include, for example, activating WiFi when coming near another computing device with which the user might want to share data, or activating Bluetooth when the user gets into an automobile and wants to use a wireless headset for any incoming or outgoing calls. As discussed, continually leaving these components on can significantly drain battery life, particularly when multiple such components are active on a small mobile device. Similarly, users may not appreciate having to turn each of these components on and off each day to conserve power, particularly when a user forgets to activate a component and misses an important call or message, or when the user forgets to deactivate a component and causes the device to run out of power.

Figure 2:
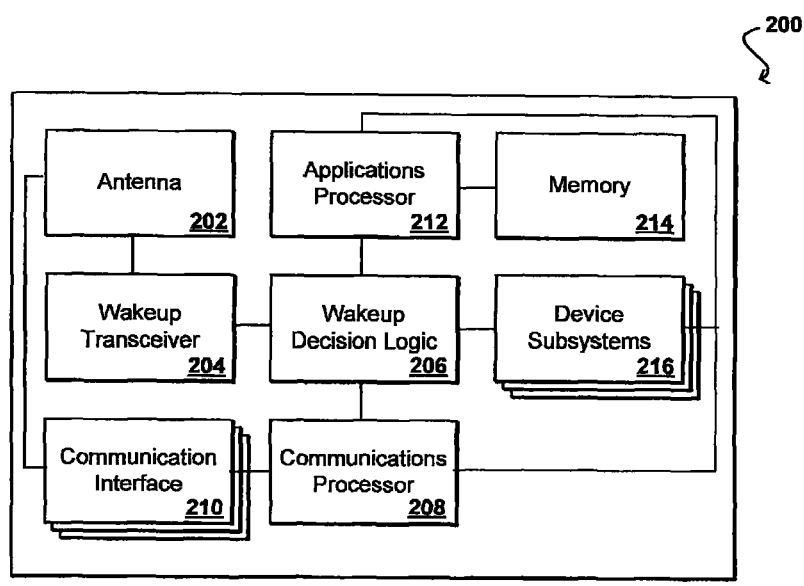
FIG. 2 illustrates an example of components of an example computing device that can be used in accordance with various embodiments.

Systems and methods in accordance with various embodiments can overcome these and other deficiencies in various conventional devices by utilizing at least one wakeup transceiver that can operate continually in at least some embodiments, and is able to trigger or activate one or more functional components or other such elements of an electronic or computing device as needed. For example, FIG. 2 illustrates components of an example computing device 200 that can be utilized in accordance with various embodiments. It should be understood, however, that various other components and configurations can be utilized within the scope of the various embodiments. In this example, the device includes at least one antenna 202 or other such element operable to receive an appropriate signal transmitted from another device, such as a Bluetooth signal, radio signal, WiFi signal, cellular signal, and the like. In at least some embodiments, the same or similar antenna elements are also utilized to transmit such signals for purposes of two-way communication for any of these types of communication channel. Various types of antenna for such purposes are known in the art and as such will not be discussed herein in detail.

As known in the art for device communications, the antenna can be connected directly or indirectly to one or more communications interface elements 210, such as may include elements or components for receiving and decoding signals of any type discussed herein, such as Bluetooth, radio signals, wireless Internet, cellular signal, and the like. Also as known, the communications interfaces 210 can work with one or more communications processors 208 to provide information to one or more applications or main system processors 212, send information to various device subsystems 216, or perform other such actions.

In this example computing device 200, however, the antenna 202 is also connected to at least one wakeup transceiver 204. As discussed, the wakeup transceiver 204 is configured to receive beacons or other such signals via the antenna 202 and pass information in the signal to at least one wakeup decision logic component 206, which can include any appropriate combination of hardware, firmware, and software for analyzing information contained in the received beacon signals. In this example device, the wakeup logic 206 can analyze the signal for information such as a type of device or type of functionality specified in the signal, and then can send a corresponding signal to at least one appropriate component of the computing device. For example, if the beacon comprises a request to establish communication over a particular type of communication channel, the logic can send an activation signal or similar instruction to an appropriate communications component 208, 210, assuming the device contains such a component, in order to enable communications to be established over that type of communication channel. If the beacon includes an identifier for a type of device, for example, the wakeup decision logic can send a request to an appropriate system or application processor 212 to attempt to determine the type(s) of functionality that should be activated on the device. For example, if the other device sending the beacon is a portable gaming device, the computing device 200 might launch a particular gaming application in addition to establishing communications over an appropriate channel. An applications and/or wakeup processor can also cause various other device subsystems to activate, such as to activate a display screen of the device, activate an infrared transceiver for gesture or motion control, etc.

In one embodiment, the wakeup transceiver is an ultra-low power transceiver (e.g., under 100 microamps of current) operable to receive and transmit low frequency modulated signals. These signals can include, for example, amplitude-modulated (AM) radio signals or amplitude-shift keying (ASK) modulated signals, where the amplitude of an analog carrier signal can vary per the modulating stream. Such signals are generally reliable even in the presence of strong interference, atmospheric noise, varying propagation conditions, and other such factors. In some embodiments, the transceiver attempts to locate at least one digital wakeup pattern in a received beacon signal and, in response, sends at least one corresponding signal to the wakeup decision logic. An example of such a receiver is the AS3931 three channel receiver offered by Austria Microsystems AG of Unterpremstaetten, Austria. The transceiver in at least some embodiments can include at least one pattern detection algorithm (either as part of the transceiver or wakeup decision logic) operable to detect one or more patterns in a received beacon signal. In at least some embodiments, there can be multiple receiver and/or transmitter channels for the transceiver 204.

In order to provide various functionality described herein, the example device 200 includes at least one central processor 212 as discussed herein for executing instructions that can be stored in at least one memory device or element 214. As would be apparent to one of ordinary skill in the art, the device can include many types of memory, data storage or non-transitory computer-readable storage media, such as a first data storage for program instructions for execution by the processor 212, the same or separate storage can be used for images or data, a removable storage memory can be available for sharing information with other devices, etc. The device typically will include some type of display element (not shown), such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology. The device can also include various subsystems that can be activated via the wakeup transceiver, such as one or more image capture elements based on any appropriate technology, such as a CCD or CMOS image capture element operable to capture image or video information, or an infrared transceiver for motion or gesture input. The device also can include at least one audio capture element, as may include one or more microphones or other such elements, as well as other types of input element, as may include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

Figure 3A:
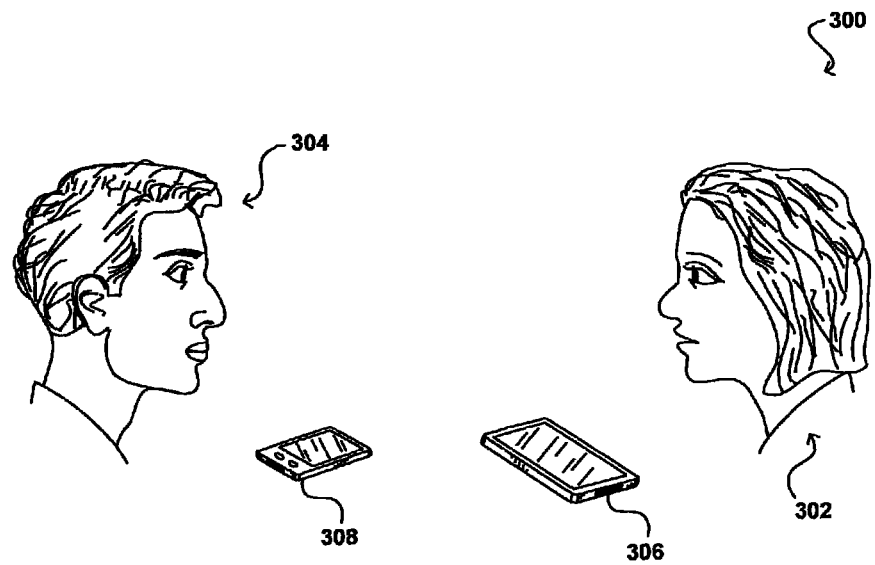
FIGS. 3(a) and (b) illustrate an example approach to detecting a nearby device and activating functionality on a computing device that can be used in accordance with various embodiments.
Figure 3B:
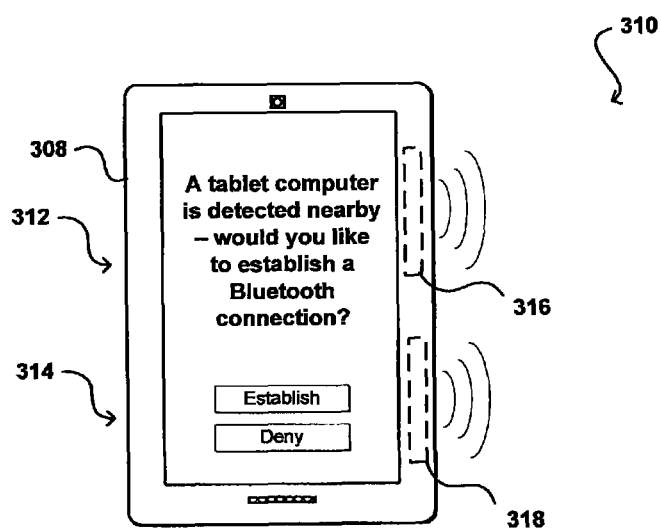

FIGS. 3(a) and 3(b) illustrate an example situation 300 wherein such a transceiver can be used to establish communications with another device in accordance with various embodiments. In FIG. 3(a), two users 302, 304 enter a common environment, such that the computing devices 306, 308 for each user come within a beacon transmission range of each other. As illustrated in the example situation 310 of FIG. 3(b), one of the computing devices 308 has a wakeup transceiver 316 active when the computing device comes within range of the other device. In this example, the devices are able to communicate with each other over a wireless Internet channel when the wireless Internet channel components are active on each device. In order to conserve power, the wireless Internet components 318 on at least the example computing device 308 are not active when the two devices come within range of each other.

In this example, each device 306, 308 is generating a beacon indicating a request to establish wireless Internet communications, although any appropriate information could be included in the signal as discussed elsewhere herein. In FIG. 3(b), the wakeup transceiver 316 is transmitting the beacon for the device 308 and receives the beacon for the other device 306. When the transceiver 316 receives the beacon from the other computing device 306, the transceiver (or logic components for the transceiver) determines the information in the beacon and causes the wireless Internet components 318 on the computing device 308 to become active. This can occur, for example, by the wakeup decision logic sending a signal to a central processor or to an element associated with the wireless Internet communication components 318. The wireless communication component 318 then can attempt to establish a wireless communication channel with the other device 306 using any appropriate approach known or used in the art for such purposes, including a request an acknowledgement, a handshake, etc. In at least some embodiments the devices can be configured to establish the communication channel connection automatically, such as where information for each device is stored on a white list on the other device. In at least some embodiments, or where such information is not available, the computing device 308 will instead prompt the user to authorize the connection, for purposes such as privacy and security. In this example, a message 312 or other such notification is presented to the user whereby the user can use one or more input elements 314 to, for example, establish the connection or deny the request. Various other options can be used as well within the scope of the various embodiments.

In at least some embodiments, the transceiver can also be used to turn off or deactivate the communications channel For example, there might be a minimum amount of time that a communications channel is left active after a communication, such as at least one minute after a transmitted or received communication. If, after this time, the computing device 308 no longer receives a beacon from the other device 306, a component on the device might cause the communication channel to become deactivated. This can involve, for example, sending a notification for each time a beacon signal is received to a central processor, or tracking received beacons on the transceiver components and then sending a signal when a beacon has not been received for at least a minimum period of time. Various other approaches can be used as well as should be apparent to one of ordinary skill in the art in light of the present disclosure.

Figure 4:
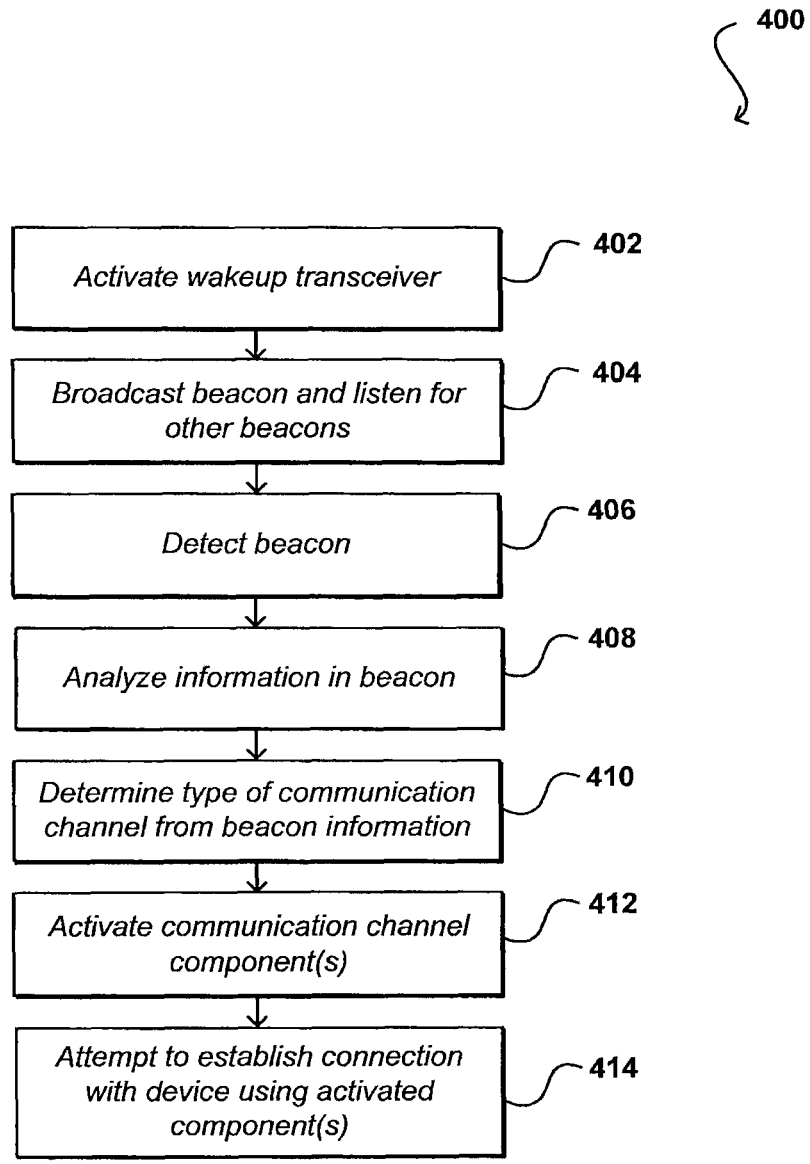
FIG. 4 illustrates an process for activating functionality on a computing device that can be used in accordance with various embodiments.

FIG. 4 illustrates an example process 400 for performing such a communications connection that can be used in accordance with various embodiments. It should be understood that there can be additional, fewer, or alternative steps performed in similar or alternative orders, or in parallel, within the scope of the various embodiments. In this example, the wakeup transceiver is activated 402. The activation can be performed manually by a user, automatically upon activation of the device, in response to execution of an application, etc. As discussed, in at least some embodiments the transceiver is active at any time when the device is active. While the transceiver is active, the transceiver can broadcast a beacon, or other such signal, and also listen for a beacon from other devices 404. In at least some embodiments, the broadcasting functions like a heartbeat signal, where an identifier or other such piece of information is broadcast at regular intervals, such as once every second or few seconds, enabling other devices to determine that the device is currently in range. Various other periods or approaches can be used as well.

When a beacon is detected by the transceiver 406, the information in the beacon is analyzed 408 and one or more logic components can determine an appropriate response to the received information. In this example process, the logic components determine a type of communication channel to be used to communicate with the other device based at least in part upon the information in the received beacon and the available channels on the present device 410. The wakeup logic then can cause the appropriate communication channels to be activated 412, either by contacting those components directly or communicating with a processor or other element operable to cause the channel components to activate. The device can attempt to establish communications with the other device over that channel using the activated components 414. In some embodiments, identifying information from the beacon can be used to establish the communications, while in other embodiments the communications components are activated without such information, whereby a conventional detection and connection process can be utilized. Various other approaches can be utilized as well. As discussed, in at least some embodiments the device can monitor the beacon and, in response to no longer receiving the beacon, deactivate the communication components if no other device is communicating with the device over that communications channel or there is otherwise no reason to leave that channel active at the present time.

As mentioned, such a process can enable multiple devices, of similar or different types, to become aware of each other's presence based upon numbers and/or identities included in the broadcast beacon signals from each device. For example, two users might agree to meet at a certain time at a specified location, as may be stored to the users' calendars. When both users arrive at the location, their receptive devices will each detect the beacon broadcast by the other user's device, which can activate one or more components on each device to notify the user of the other user's presence, such as by generating an audible tone, causing a vibration, displaying a message on a screen, or performing another such action. Where possible, the devices can also indicate a relative direction and/or position of the other device, such that the users can more quickly find each other.

In another example, multiple users might be interested in playing a multi-player game whenever there are enough users around to play that game. For example, a game might require four users to be in proximity before that game can be played. In some embodiments, a device can monitor the presence of other devices based at least in part upon the received beacons. The device can monitor information in each beacon, and can track the devices that have expressed interest in the specified game. When at least three other devices are detected nearby that have expressed such interest, the device can notify the user of the device such that the user can send requests to each user to determine whether there is interest at the current time to play the game. In some embodiments, the game can start automatically, each user can be prompted for a response, or other such approaches can be utilized. On each device, a transceiver can receive the signal and appropriate decision logic can determine any components or functionality to activate on each respective device. As discussed, this can involve not only waking up another communications interface, but activating or triggering a change in functional state of any appropriate element or component on the respective device.

As discussed, such an approach can be used to establish communications or interact with other types of devices as well. For example, a wakeup receiver can be configured to automatically activate Bluetooth on a device whenever the device comes within range of the user's car, a user's headset or earpiece, or another such device. Similarly, the transceiver can be configured to activate WiFi on the device whenever the device is in a WiFi hotspot. As discussed, the amount of data that can be transmitted via the beacon can be limited, such as to about a couple of hundred bits per second in some embodiments, but an amount of identifying information can be included to enable the transceiver to communicate with at least one appropriate component of the device.

Figure 5:
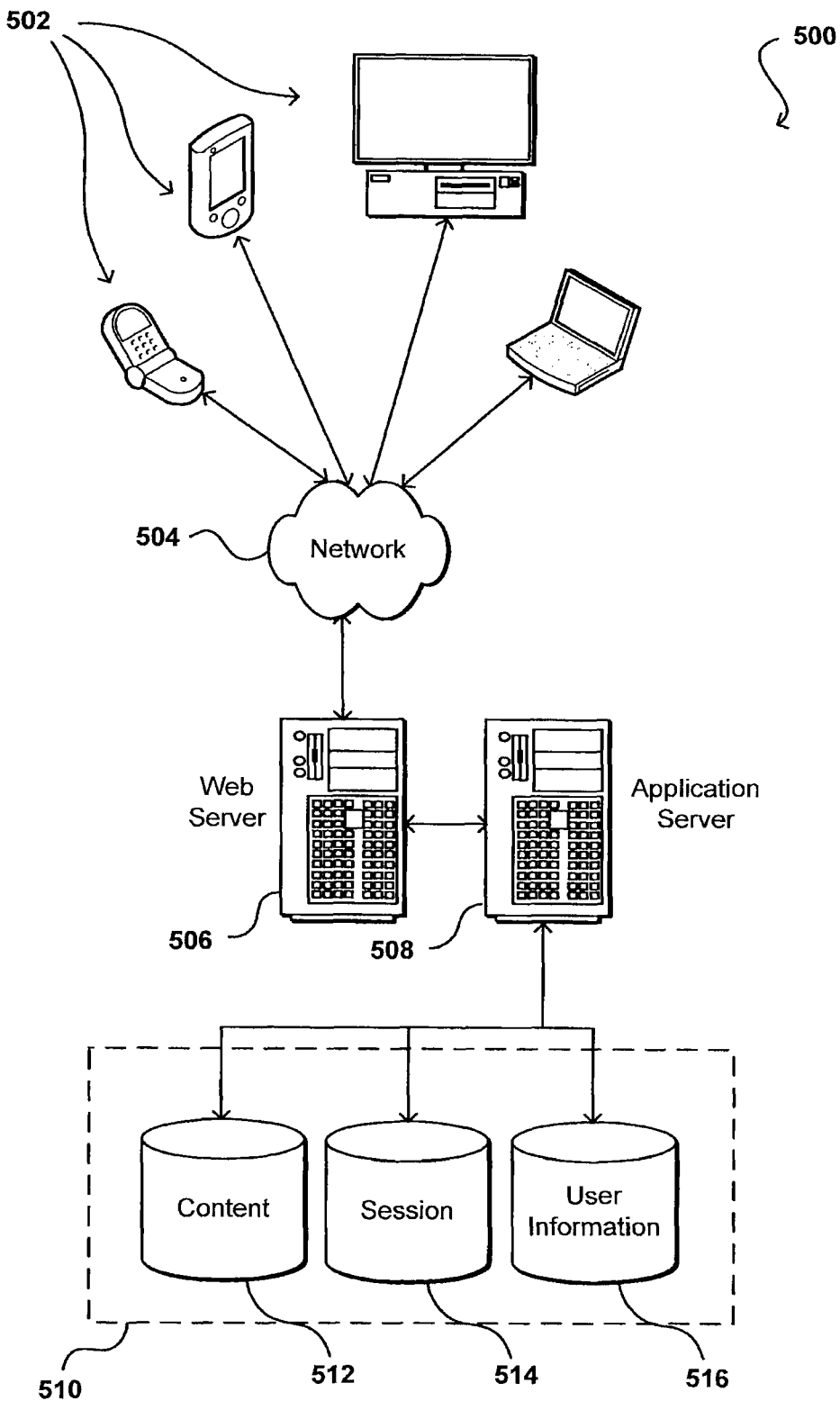
FIG. 5 illustrates an example environment in which various embodiments can be implemented.

As discussed, different approaches can be implemented in various environments in accordance with the described embodiments. For example, FIG. 5 illustrates an example of an environment 500 for implementing aspects in accordance with various embodiments. As will be appreciated, although a Web-based environment is used for purposes of explanation, different environments may be used, as appropriate, to implement various embodiments. The system includes an electronic client device 502, which can include any appropriate device operable to send and receive requests, messages or information over an appropriate network 504 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 506 for receiving requests and serving content in response thereto, although for other networks, an alternative device serving a similar purpose could be used, as would be apparent to one of ordinary skill in the art.

The illustrative environment includes at least one application server 508 and a data store 510. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 508 can include any appropriate hardware and software for integrating with the data store 510 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 506 in the form of HTML, XML or another appropriate structured language in this example. The handling of all requests and responses, as well as the delivery of content between the client device 502 and the application server 508, can be handled by the Web server 506. It should be understood that the Web and application servers are not required and are merely example components, as structured code discussed herein can be executed on any appropriate device or host machine as discussed elsewhere herein.

The data store 510 can include several separate data tables, databases or other data storage mechanisms and media for storing data relating to a particular aspect. For example, the data store illustrated includes mechanisms for storing content (e.g., production data) 512 and user information 516, which can be used to serve content for the production side. The data store is also shown to include a mechanism for storing log or session data 514. It should be understood that there can be many other aspects that may need to be stored in the data store, such as page image information and access rights information, which can be stored in any of the above listed mechanisms as appropriate or in additional mechanisms in the data store 510. The data store 510 is operable, through logic associated therewith, to receive instructions from the application server 508 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 502. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 5. Thus, the depiction of the system 500 in FIG. 5 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of establishing communications between computing devices, comprising:
   broadcasting a first beacon from a first computing device using a first transceiver of the first computing device;
   detecting a second beacon broadcast from a second computing device using the first transceiver of the first computing device;
   analyzing information contained in the second beacon using decision logic of the first computing device to determine a type of communications channel to use to communicate with the second device;
   activating at least one communications component on the first computing device for the determined type of communications channel; and
   automatically establishing communications with the second computing device over the communications channel, wherein the first computing device is operable to activate at least one communications component for communicating with the second computing device when the first computing device comes within a broadcast range of the second computing device.

2. The method of claim 1, wherein the first beacon causes the second computing device to activate at least one communications component on the second computing device for the determined type of communications channel.

3. The method of claim 1, wherein the first transceiver includes at least a transmitting component, a receiving component, and the decision logic for analyzing information contained within the second beacon.

4. The method of claim 1, wherein the information contained in the second beacon includes at least one of a device identifier, a type of the second device, and a type of the communications channel.

5. The method of claim 1, wherein broadcasting of the first beacon happens concurrently with listening for the second beacon using the first transceiver.

6. A method of activating functionality on a computing device, comprising:
    under control of one or more computer systems configured with executable instructions,
        broadcasting a first beacon signal from a transceiver of the computing device;
        detecting a second beacon signal using the transceiver of the computing device, the second beacon signal being transmitted from a separate device;
        determining information contained within the second beacon signal;
        determining, using decision logic of the computing device, at least one type of functionality to activate on the computing device in response to the determined information contained within the second beacon signal; and
        automatically activating the at least one type of functionality on the computing device,
        wherein the computing device is operable to activate one or more types of functionality in response to detecting at least one separate device within a broadcast range of the computing device.

7. The method of claim 6, wherein the decision logic is further operable to determine not to activate any functionality in response to receiving the second beacon signal based at least in part upon the determined information contained within the second beacon signal.

8. The method of claim 6, wherein the at least one type of functionality includes at least one communication mechanism of the computing device as specified by the information contained within the second beacon.

9. The method of claim 6, wherein determining information contained within the second beacon signal includes decoding information modulated into at least one of an amplitude or frequency of the second beacon.

10. The method of claim 6, wherein each of the first and second beacons is an amplitude-modulated (AM) or amplitude-shift keying (ASK) modulated radio signal.

11. The method of claim 6, further comprising:
    determining at least one type of functionality to adjust on the computing device when no type of functionality is to be activated in response to the determined information; and
    automatically adjusting the at least one type of functionality on the computing device.

12. The method of claim 6, further comprising:
    monitoring receipt of the second beacon by the transceiver of the computing device; and
    deactivating the at least one type of functionality on the first computing device when the second beacon is not received by the transceiver for at least a minimum period of inactivity.

13. The method of claim 6, wherein determining information contained within the second beacon signal includes utilizing at least one pattern matching algorithm to detect a wakeup pattern transmitted via the second beacon.

14. The method of claim 6, wherein the transceiver requires less power to operate than the at least one type of functionality.

15. The method of claim 6, wherein the transceiver operates continually during operation of the computing device.

16. The method of claim 6, wherein the transceiver of the computing device broadcasts the first beacon signal at regular intervals.

17. The method of claim 6, wherein the type of functionality includes at least one of radio signal communication, wireless network communication, and cellular communication.

18. A method of activating functionality on an electronic device, comprising:
    activating a wakeup receiver on the electronic device, the wakeup receiver operable to detect at least a modulated radio signal;
    detecting a beacon signal using the wakeup receiver, the beacon signal being transmitted from a separate device;
    determining, using at least one logic element of the electronic device, at least one type of functionality to activate on the electronic device in response to the detected beacon signal; and
    automatically activating the at least one type of functionality on the electronic device,
    wherein the electronic device is operable to activate one or more types of functionality in response to detecting at least one separate device within a broadcast range of the separate device.

19. The method of claim 18, further comprising:
    determining information contained within the received beacon signal,
    wherein the at least one type of functionality to activate depends at least in part upon the determined information.

20. The method of claim 18, wherein the at least one type of functionality includes at least one communication mechanism of the electronic device.

21. A client device, comprising:
    a processor;
    a wakeup transceiver element;
    at least one decision logic element;
    at least one wireless communication element; and
    a memory device including instructions that, when executed by the processor, cause the client device to:
        repeatedly broadcast a first beacon from the wakeup transceiver element;
        detect a second beacon using the wakeup transceiver element, the second beacon being transmitted from a separate device;
        determine information contained within the second beacon;
        determine, using the at least one decision logic element, at least one wireless communication element to activate on the client device in response to the determined information; and automatically activate the determined at least one wireless communication element on the client device, wherein the client device is operable to activate at least one wireless communication element to establish communications with the separate device in response to detecting the separate device within a broadcast range of the client device via the second beacon.

22. The client device of claim 21, wherein the instructions when executed further cause the client device to:

decode information modulated into at least one of an amplitude or frequency of the second beacon.

23. The client device of claim 21, wherein the instructions when executed further cause the client device to:

monitor receipt of the second beacon by the wakeup transceiver element; and deactivate the at least one wireless communication element when the second beacon is not received by the wakeup transceiver element for at least a minimum period of inactivity.

24. The client device of claim 21, wherein the at least one wireless communication element is capable of establishing a wireless communication channel based on at least one of radio signal communication, wireless network communication, and cellular communication.

25. A non-transitory computer-readable storage medium storing instructions for activating functionality on a computing device, the instructions when executed by a processor causing the processor to:

broadcast a first beacon from a transceiver of the computing device;

detect a second beacon using a transceiver of the computing device, the second beacon being transmitted from a second device;

determine information contained within the second beacon;

determine at least one type of functionality to activate on the computing device in response to the determined information; and automatically activate the at least one type of functionality on the computing device, wherein the computing device is operable to activate one or more types of functionality in response to detecting at least one second beacon broadcast by at least one second device within a broadcast range of the computing device.

26. The non-transitory computer-readable storage medium of claim 25, wherein the at least one type of functionality includes at least one communication mechanism of the computing device as specified by the information contained within the second beacon.

27. The non-transitory computer-readable storage medium of claim 25, wherein the first beacon causes the separate computing device to activate at least one communications component on the separate computing device for the determined type of communications channel.

* * * * *